(No Model.) 3 Sheets—Sheet 2.
P. H. ADAMS, Jr. & O. T. X. ADAMS.
PLANT FOR USE IN SMELTING ORES.
No. 399,124. Patented Mar. 5, 1889.
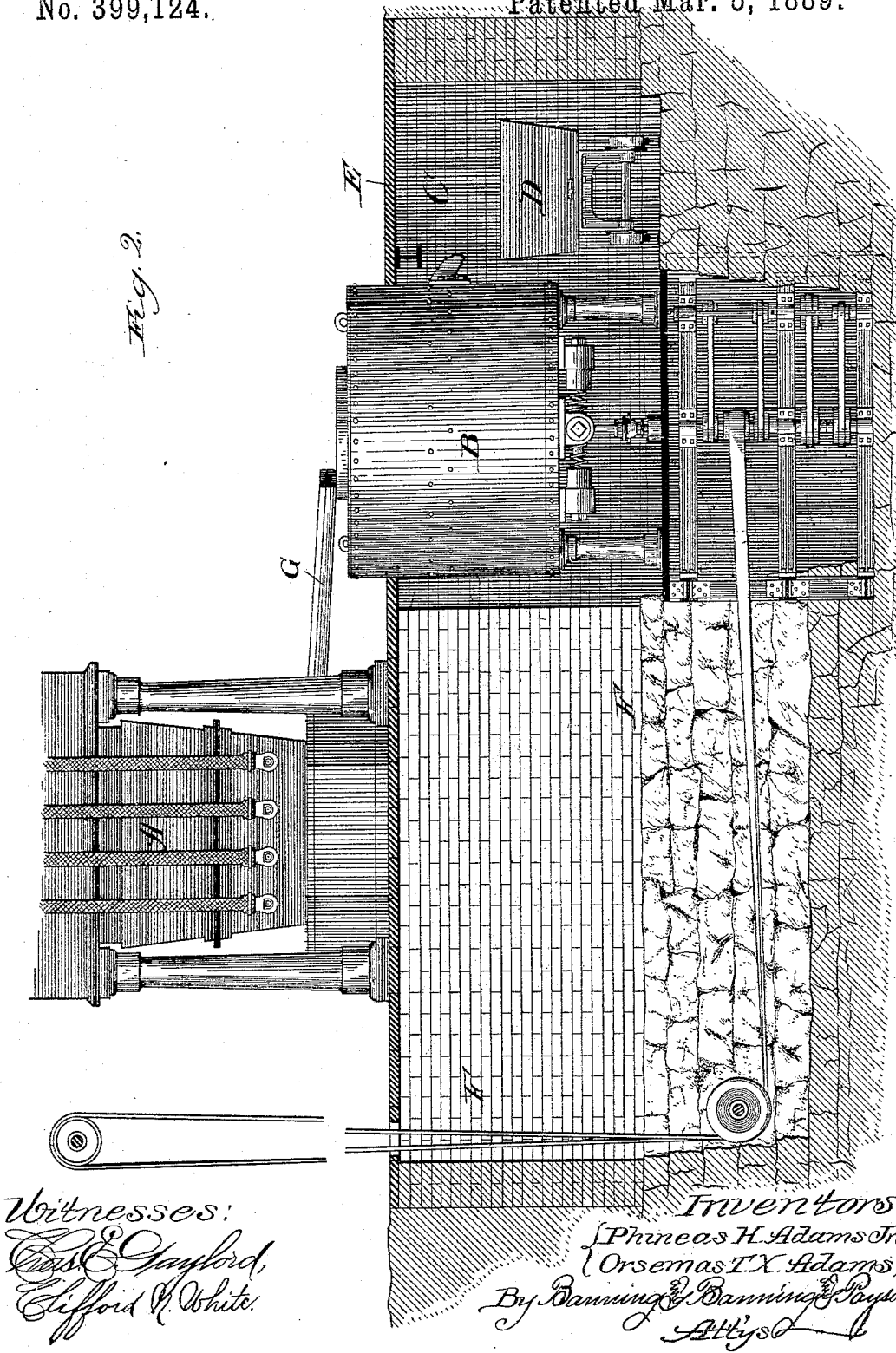
Witnesses:
Chas. E. Gaylord,
Clifford N. White.
Inventors:
Phineas H. Adams Jr.,
Orsemas T. X. Adams,
By Banning & Banning & Payson,
Attys

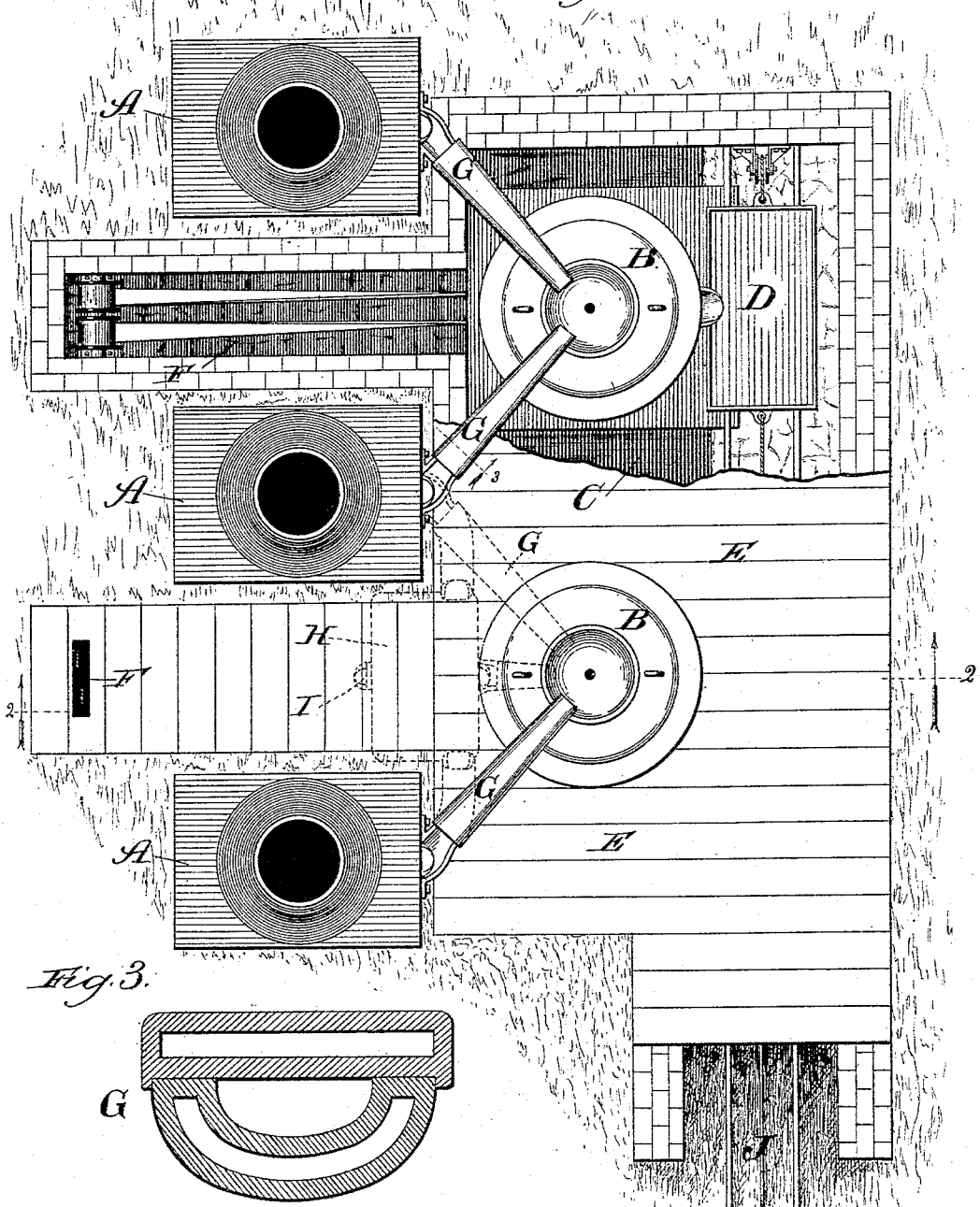

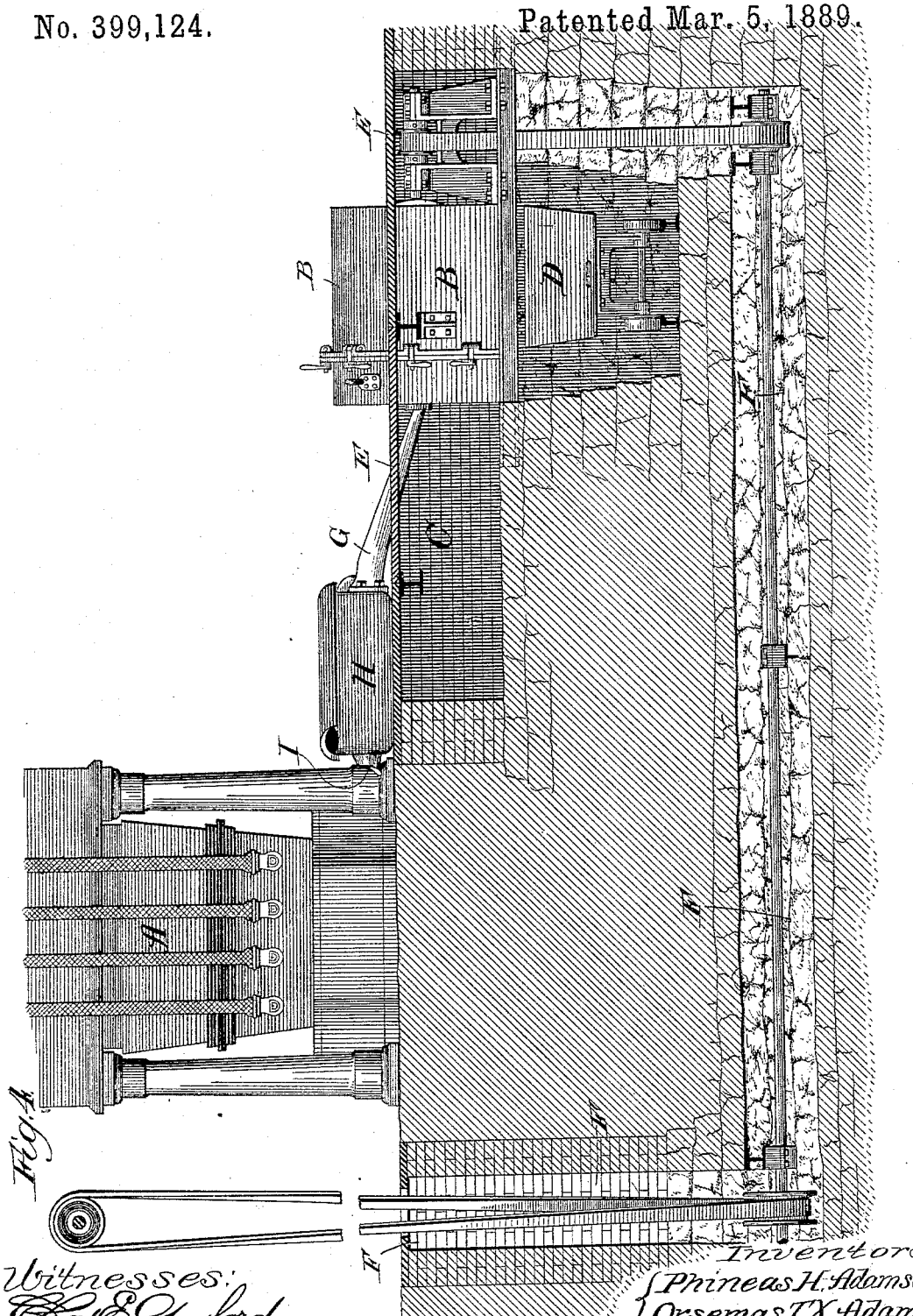

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

PLANT FOR USE IN SMELTING ORES.

SPECIFICATION forming part of Letters Patent No. 399,124, dated March 5, 1889.

Application filed January 3, 1889. Serial No. 295,370. (No model.)

*To all whom it may concern:*

Be it known that we, PHINEAS H. ADAMS, Jr., and ORSEMAS T. X. ADAMS, citizens of the United States, residing at Chicago, Illinois, have invented a certain new and useful Plant for Use in Smelting Ores, of which the following is a specification.

The object of our invention is to arrange a plant for use in smelting ores and centrifugally treating the resulting materials and mechanically decomposing chemical compounds, metallic salts or salts of metals, and desulphurizing ores or their resulting material as they flow from the smelting-furnace, when the substances treated are in a molten condition, by the action of centrifugal force; and our invention consists in the arrangement and combination of the various features hereinafter described and claimed.

In the drawings, Figure 1 is a plan view of a number of smelting-furnaces with our centrifugal apparatus in place. Fig. 2 is a section on the line 2 2 of Fig. 1, showing the lower part of one of the smelting-furnaces and one of the centrifugal apparatuses in elevation, the apparatus being located in an excavation. Fig. 3 is a cross-section of one of the troughs or pipes for conveying the molten material from the smelting-furnace to the centrifugal apparatus, taken in the line 3 of Fig. 1, looking in the direction of the arrow; and Fig. 4 is a side elevation of the lower part of a smelting-furnace, a horizontal centrifugal apparatus, and a precipitating receptacle arranged between the two.

In arranging our plant for use in smelting ores and centrifugally treating the resulting materials and mechanically decomposing their chemical compounds, metallic salts or salts of metals, and desulphurizing ores or their resulting materials as they flow from the smelting-furnaces, and while the substances treated are in a molten condition, by the action of centrifugal force, we prefer to arrange the smelting furnace or furnaces and the centrifugal apparatus or apparatuses in such relation to each other that the material to be treated may be conveyed directly and by gravity from the smelting-furnaces to the apparatus in which it is treated. To this end we prefer to arrange several smelting-furnaces, preferably in close proximity to each other, and in a line or row, and to arrange a number of centrifugal apparatuses in proximity to each other and to the smelting-furnaces, and preferably in a row on the same side of the smelting-furnaces.

We do not propose in this patent to claim any special construction of smelting-furnace, nor any special construction of centrifugal apparatus. We contemplate the use of different kinds of smelting-furnaces and of different kinds of centrifugal apparatuses, whether arranged vertically or horizontally. We need not therefore enter into the details of construction of either the furnaces or the centrifugal apparatuses, but shall proceed to describe the adaptation of each to the other to secure the results desired in the most convenient and economical manner.

After arranging a number of smelting-furnaces, A, intended to enter into the plant in their respective positions, and, as before said, preferably in a row, we arrange one or more centrifugal apparatuses, B, close to them, preferably in a row, where more than one are used, and preferably in a trench or excavation, C, so as to bring them into such relative height to the smelting-furnaces that the material in a molten state may flow directly from the furnaces to the apparatus. The trench or excavation in which the centrifugal apparatuses are arranged should be of sufficient size to permit access to the apparatus and, if desired, the introduction of a car or other means along a passage, J, for conveying away the material discharged by centrifugal force from the receiving-vessel of the apparatus.

Although we have shown the centrifugal apparatuses as extending slightly above the surface of the ground, we would recommend that they be arranged low enough down to permit the trench or excavation in which they are located to be covered, so as to present a uniform surface; but the trench or excavation should be covered by a floor or cover, E, whether the tops of the centrifugal apparatus extend above the surface of the ground or not, as it is important to provide a level even surface before the furnaces for conducting operations. We also prefer to provide the trench or excavation with extensions or conduits F, along which the belts or shafts for transmitting power to rotate the actuating-shafts of the centrifugal apparatus may be conveyed.

Of course it will be understood that the power for rotating the actuating-shafts will be provided by the use of a steam-engine, water-power, or other convenient means, which need not be described in detail.

Extending from each of the smelting-furnaces to the centrifugal apparatuses we arrange spouts or conduits G, as shown in the different figures of the drawings. Where a less number of centrifugal apparatuses than smelting-furnaces are used, the molten material from more than one smelting-furnace may be carried to the same centrifugal apparatus, as illustrated in Fig. 1 of the drawings. In Fig. 3 we have shown a cross-section of the pipe or spout, where we have shown it with spaces in its walls to prevent the radiation of heat; but however the pipes or spouts may be made, we prefer to provide them with a cover, so that the material flowing from the smelting-furnaces will be maintained at as great a heat as possible, so as to preserve its fluidity. We also prefer to use a precipitating-receiver, H, as shown in Fig. 4 and in dotted lines in Fig. 1. The object of this precipitating-receiver is to afford means to permit the heavier particles of the material, which will readily precipitate, to settle and be caught without passing them into the centrifugal apparatus. This precipitating-receiver, however, may be dispensed with and all of the material carried into the centrifugal apparatus, if preferred, or it may form the sole conduit between the smelting-furnaces and the receiving-vessels, dispensing with pipes or spouts. If used, however, it may be provided with a spout or tap-hole, I, to enable the material settling in it to be drawn off from time to time, as desired.

In operation the ores or metals, of whatever kind they may be, are smelted or reduced to a molten condition in the smelting-furnaces in the usual way. When thus reduced to a condition of fluidity, the material is conveyed from the smelting-furnaces into the centrifugal apparatus. The receiving-vessels of the centrifugal apparatuses are rotated at a very high rate of speed—preferably several thousand revolutions a minute—which causes the heavier particles in the material treated to pass to the outside, where they are retained, and the lighter particles to the center of the rotating receiving-vessels, whence they are discharged by the action of centrifugal force. After the lighter particles of the material have been discharged from the receiving-vessels they are caught in any convenient way and flowed or conveyed into the cars or receptacles provided for their removal, whence they are taken from time to time and dumped or deposited wherever desired. In the drawings we have shown an opening or passage, J, along which we preferably provide a track, on which the cars are moved as they are introduced to the trench or excavation, or conveyed away to receive or to carry off the load of material.

What we regard as new, and desire to secure by Letters Patent, is—

1. In a plant for smelting ores and centrifugally treating the resulting materials, the combination of a smelting-furnace for reducing ores to a molten condition, a centrifugal apparatus provided with a revoluble receiving-vessel adapted to receive molten material to be treated, pipes, spouts, or conduits connecting the smelting-furnace with the receiving-vessel, through which the molten material to be treated may be flowed into the same, and means for rotating such receiving-vessel, substantially as described.

2. In a plant for smelting ores and centrifugally treating the resulting materials, the combination of a smelting-furnace for reducing ores to a molten condition, a centrifugal apparatus provided with a revoluble receiving-vessel adapted to receive molten material to be treated, pipes, spouts, or conduits connecting the smelting-furnace with the receiving-vessel, through which the molten material to be treated may be flowed into the same, a precipitating-receiver intermediate the smelting-furnace and the receiving-vessel, into which the heaviest particles of the molten material may settle, and means for rotating the receiving-vessel, substantially as described.

3. In a plant for smelting ores and centrifugally treating the resulting materials, the combination of a smelting-furnace for reducing ores to a molten condition, a centrifugal apparatus provided with a revoluble receiving-vessel adapted to receive molten material to be treated, and arranged in an excavation bringing the mouth of the receiving-vessel below the tapping-point of the smelting-furnace, pipes, spouts, or conduits connecting the smelting-furnace with the receiving-vessel, through which the molten material to be treated may be flowed into the same, and means for rotating such receiving-vessel, substantially as described.

4. In a plant for smelting ores and centrifugally treating the resulting materials, the combination of a smelting-furnace for reducing ores to a molten condition, a centrifugal apparatus provided with a revoluble receiving-vessel adapted to receive molten material to be treated, and arranged in an excavation, bringing the mouth of the receiving-vessel below the tapping-point of the smelting-furnace, a passage to the excavation containing the centrifugal apparatus, a floor or covering over such passage, pipes, spouts, or conduits connecting the smelting-furnace with the receiving-vessel, through which the molten material to be treated may be flowed into the same, and means for rotating such receiving-vessel, substantially as described.

5. In a plant for smelting ores and centrifugally treating the resulting materials, the combination of a smelting-furnace for reducing ores to a molten condition, a centrifugal apparatus provided with a revoluble receiving-vessel adapted to receive molten material to be treated, and arranged in an excavation, bringing the mouth of the receiving-vessel below the tapping-point of the smelting-furnace, branch excavations or conduits affording facilities for the introduction of the means for rotating vessel, pipes, spouts, or conduits connecting the smelting-furnace with the receiving-vessel, through which the molten material to be treated may be flowed into the same, and means for rotating such receiving-vessel, substantially as described.

PHINEAS H. ADAMS, Jr.
     ORSEMAS T. X. ADAMS.

Witnesses:
 THOMAS A. BANNING,
 EPHRAIM BANNING.